April 26, 1932.                A. BUCHI                    1,856,024
        CONTROLLING AND REGULATING DEVICE FOR COMPOUND INTERNAL
              COMBUSTION ENGINES WITH EXHAUST TURBINES
                     Filed March 10, 1924        3 Sheets-Sheet 2
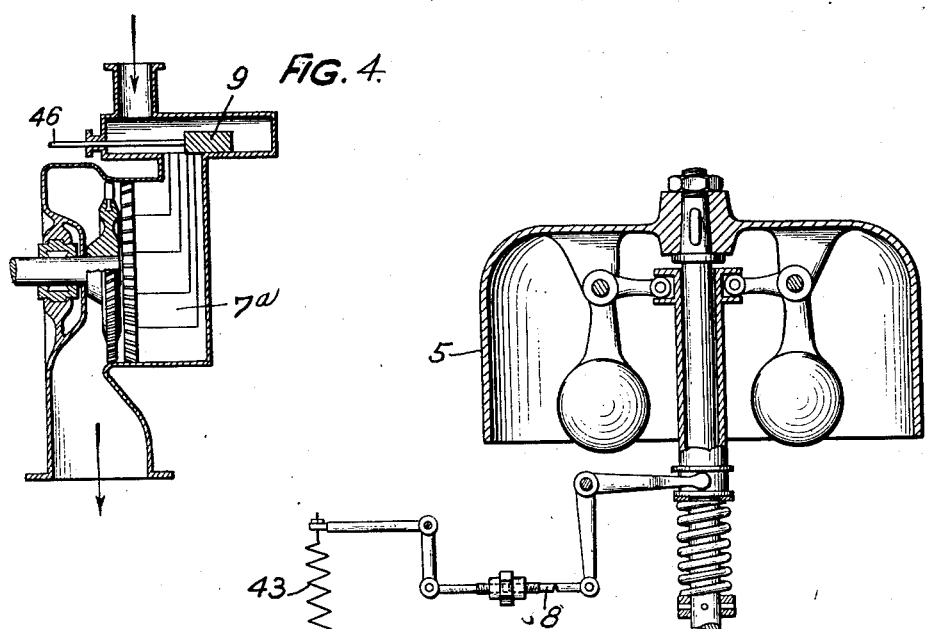
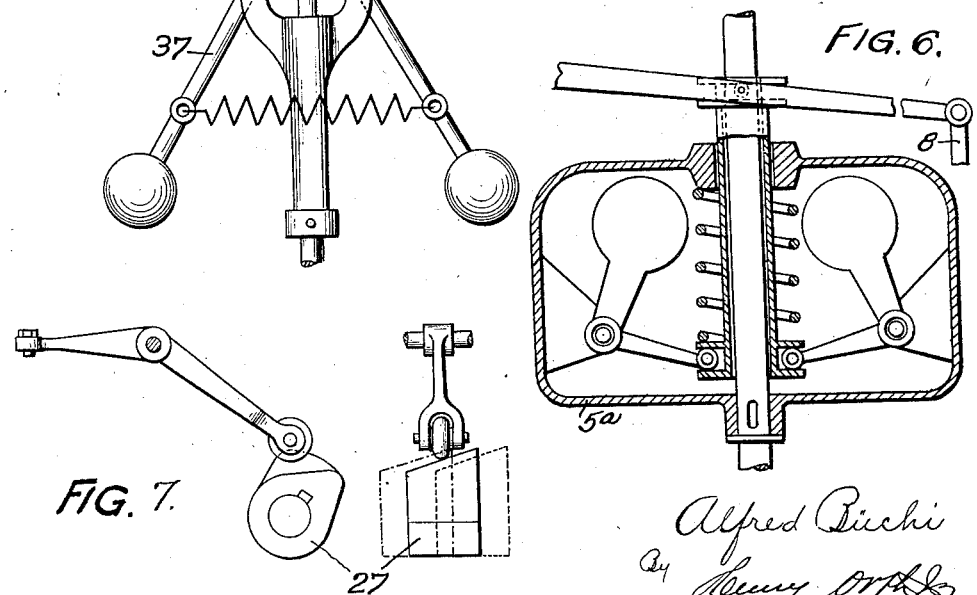

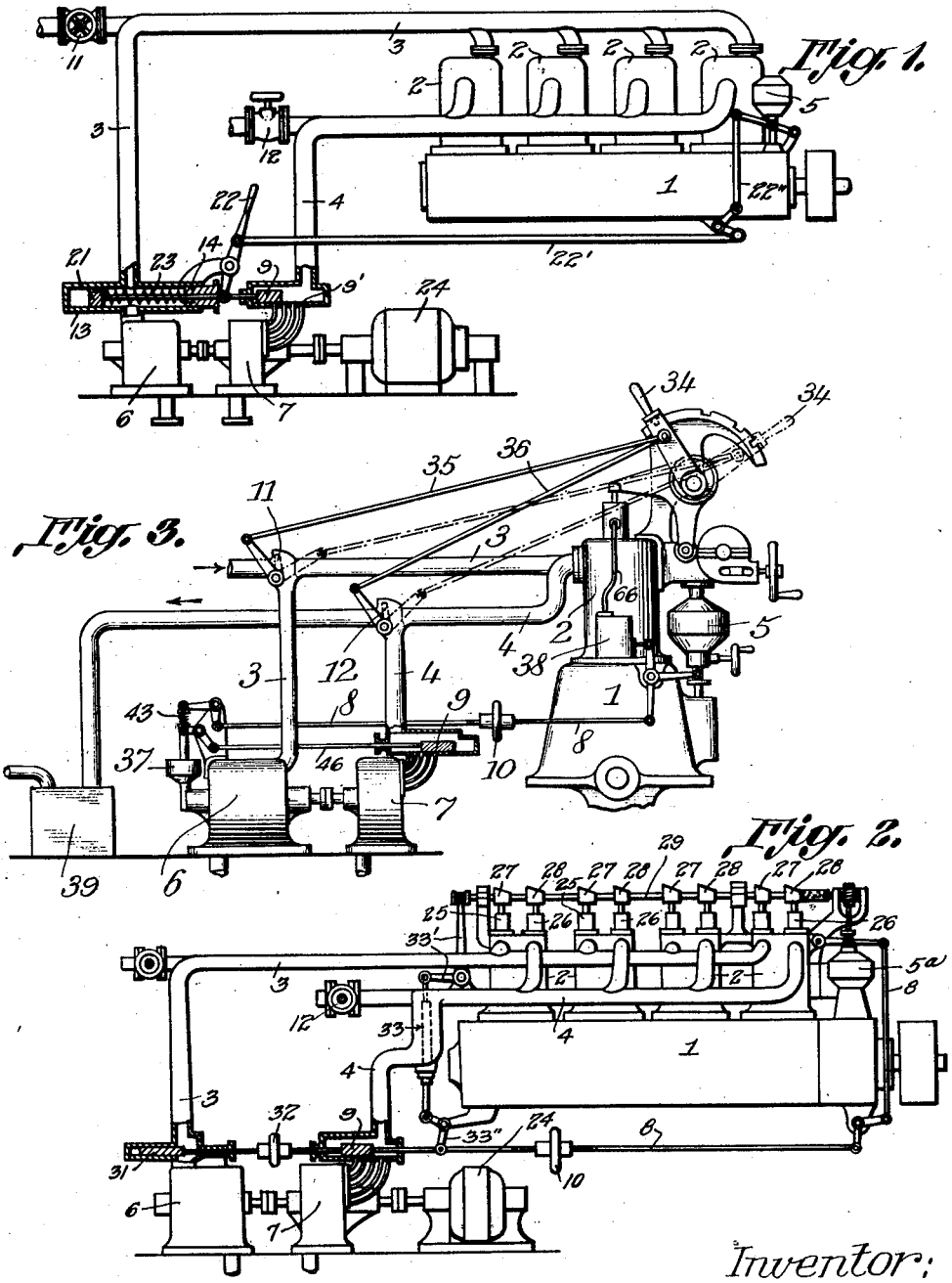

April 26, 1932. A. BUCHI 1,856,024
CONTROLLING AND REGULATING DEVICE FOR COMPOUND INTERNAL
COMBUSTION ENGINES WITH EXHAUST TURBINES
Filed March 10, 1924 3 Sheets-Sheet 3
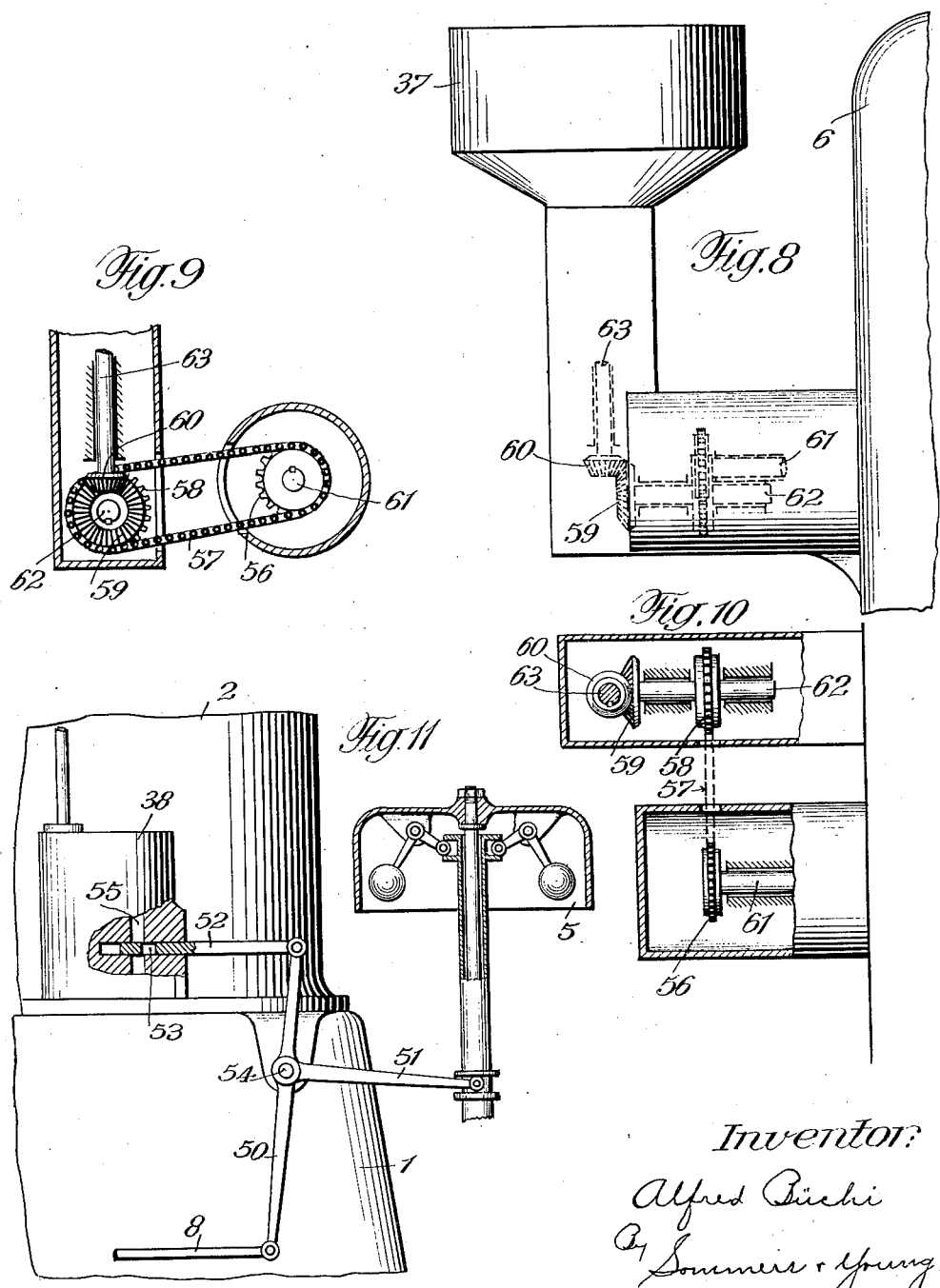

Patented Apr. 26, 1932

1,856,024

UNITED STATES PATENT OFFICE

ALFRED BUCHI, OF WINTERTHUR, SWITZERLAND

CONTROLLING AND REGULATING DEVICE FOR COMPOUND INTERNAL COMBUSTION ENGINES WITH EXHAUST TURBINES

Application filed March 10, 1924, Serial No. 698,127, and in Switzerland March 21, 1923.

The present invention relates to internal combustion engines to which the charge is supplied under pressure by a compressor driven by a turbine that is actuated by the exhaust gases of the internal combustion engine. It is known that the internal combustion engine may be regulated by a governor in any well-known way, whereas the exhaust gas turbine runs independently of mechanical driving connection with the engine, its driving power being derived entirely from the engine exhaust gases delivered to it. It is obvious that there is only a small range of load where the internal combustion engine, exhaust gas turbine, and blower work with the maximum efficiency. An object of this invention is to provide governing devices and connections by which the internal combustion engine, the exhaust gas turbine, and turbo blower are linked together and influence each other, all three of them, or at least the turbine and engine, or the blower and engine, so that each one gives the best performance under all load conditions.

Another object of this invention is to so regulate the quantity of compressed air supplied the engine and the scavenging period of the engine that proper temperature conditions in the engine and exhaust gases will be maintained under all conditions of load.

Constructional examples of the subject matter of the present invention are illustrated on the accompanying drawings, in which Fig. 1 shows, in a diagrammatic manner, an internal combustion engine, an exhaust turbine, a compressor, and connections between these parts, and interconnected and jointly influenced regulating mechanism for these parts;

Fig. 2 shows a modified form of regulating mechanism;

Fig. 3 shows a further embodiment of the invention;

Fig. 4 shows diagrammatically the construction of the exhaust turbine;

Fig. 5 is an enlarged view, partially in section, showing the type of governor for use in the mechanism according to Fig. 1, and the governor and regulating connections adapted for use in the mechanism according to Fig. 3;

Fig. 6 is an enlarged view, partially in section, of the governor and connections adapted for use in the mechanism shown in Fig. 2;

Fig. 7 shows the cam for the engine inlet and exhaust valves, the left-hand view being as from the right in Fig. 2, and the right-hand view being as from the rear in Fig. 2;

Fig. 8 is an enlarged sectional view of a part of Fig. 3 showing the connection between the compressor and governor;

Fig. 9 is a side view, partially in section, of a part of Fig. 8;

Fig. 10 is a top view of Fig. 8, partially in section; and

Fig. 11 is a side view, partially in section, of the governor and connections for controlling the fuel pump shown in Fig. 3.

In the drawings, the various machinery parts and regulating devices are only diagrammatically indicated in such a manner as is considered sufficient for illustrating the present invention, and constructional details of the parts shown will suggest themselves to persons skilled in the art.

Referring to Fig. 1 of the drawings, 1 denotes an internal combustion engine having four working cylinders 2, to which a precompressed charge is supplied by means of the conduit 3. The exhaust gases leave the cylinders through the conduit 4. The internal combustion engine is influenced by a governor 5 which regulates the speed of the engine by controlling the quantity of fuel supplied thereto by a mechanism such as that shown generally at 38 in Fig. 3. In accordance with the special arrangement of power engine to which the invention relates, a compressor 6 is provided in which the air for the internal combustion engine is compressed and is then supplied to the engine through conduit 3. The compressor 6, which in the present example, is shown as a compressor of the centrifugal type, is directly driven by the turbine 7. The turbine is actuated by the exhaust gases of the internal combustion engine supplied to the turbine through the conduit 4. The mechanism for supplying the fuel of the charge to the engine is not shown in Fig. 1, but this may be similar to the fuel pump and controlling mechanism diagrammatically shown in Fig. 3 and shown more in detail in Fig. 11.

The special manner of controlling and regulating the various parts of the power installation is based on the fact that the delivery pressure of the compressor depends on the speed of the turbine 7 which in turn is influenced by the quantity of exhaust gas delivered thereto from the engine and the admission area of the turbine, which can be varied by means of a slide 9, the position of which may be varied to open or close more or less turbine inlet nozzles 9'. The position of the slide 9 is controlled by a governor 5 dependent on the speed of the internal combustion engine and by another factor, such as, for instance, the pressure of the air supplied by the compressor. The engine when operating at high speed naturally delivers a larger amount of exhaust gases to the turbine.

The arrangement of the mechanism according to this invention is such that the governor of the internal combustion engine by means connecting linkage and levers such as link 22", a bell crank, link 22', and lever 22 influences the position of slide 9 which influences the speed of the exhaust turbine and consequently controls the output and delivery pressure of the compressor.

The position of the slide 9, according to the embodiment of Fig. 1, is also affected by mechanism responsive to the pressure of the air supplied by compressor 6. The pressure responsive device comprises a piston 21 moving in a cylinder 13 and having one side subjected to the pressure of the air supplied by the compressor. A coil spring 23 is attached at one end to the piston 21 and to a fixed end of the cylinder at its other end. The piston 21 is connected with slide 9 by means of a rod 14 which passes through one end of the cylinder. One end of lever 22 is attached to this rod so that both the engine governor 5 and the pressure responsive piston 21 influence the position of slide 9. The lever 22 is provided with an extension by means of which the position of slide 9 and piston 21 may be manually controlled. A governor mechanism suitable for influencing the speed of the engine and the position of slide 9 is shown in some detail in Fig. 5. The governor device 5 is of a conventional type, and it is obvious that upon increase of the speed of the engine the governor will exert a push upon link 22' and consequently tend to move slide 9 to the right to a position covering more of the turbine inlet nozzles 9', while, on the other hand, a decrease of engine speed tends to move slide 9 to the left and uncover more nozzles.

Valves 11 and 12 may be inserted in conduits 3 and 4 respectively for the purpose of permitting direct connection of these conduits with the atmosphere when it is not desired to precompress the charge.

It is apparent that in normal operation, that is, when the engine is operating under load and a precompressed charge is utilized, a number of forces will mutually contribute to control the operation of the engine and auxiliary mechanism. Upon an increase of speed the engine governor 5 tends to move slide 9 to the right thereby tending to decrease the number of turbine nozzles through which the exhaust gas may pass, whereby the pressure of the gas in exhaust conduit 4 is increased and the speed of the gas passing through the turbine is increased. With increased pressure and speed of the exhaust gases the speed of the turbine tends to increase. Since the compressor is directly driven by the turbine and since its output is controlled by its speed, the pressure of the charge increases as a result of the increase of engine speed. The pressure of the charge is effective against pressure responsive piston 21 and tends to move it to the left against the tension of springs 23 and contrary to the influence of engine governor 5 on rod 14. Naturally slide 9 will move to the position in which the forces effective on it are in equilibrium and the normal operation of the engine will thereby be automatically maintained.

Fig. 2 shows an embodiment of the invention in which the inlet and exhaust valves of the engine are so controlled by means of cams 27 and 28 that scavenging of the cylinders is effected. The construction of these cams is shown more in detail in Fig. 7.

A novel feature of the controlling and regulating means consists in controlling the timing of the inlet valves 25 and the outlet valves 26. The timing of the valves may be such that the inlet and outlet valves of a cylinder remain open simultaneously.

As illustrated in Fig. 7, the parts of the valves that touch the rollers of the valve rockers are tapered so that by an axial displacement of the cams, the timing of the valves may be so adjusted as to be open over a longer period. In Fig. 7 the position of a cam for maximum lift and longest open period is chain-dotted, for medium lift is full lines, and for minimum lift and minimum open period is dotted lines.

The means for effecting this adjustment are diagrammatically indicated and, as the cams are mounted on the cam shaft 29, the adjustment may be obtained by an axial displacement of the shaft 29, for instance, by means of rocking bell crank lever 33'.

During the scavenging action the fresh charge enters through the conduit 3 in which the cylinder forces the burnt gases present in the cylinders through the exhaust pipe 4 to the turbine 7. The engine valves may be kept open sufficiently long and the air pressure sufficiently high that after completion of the scavenging action the inlet and exhaust valves may remain open and fresh compressed air from compressor 6 passes through the cylinder into the conduit 4 leading to the turbine 7. By this provision, the temperature of the exhaust gases passing to and through the turbine can be kept within reasonable limits even when the engine is run at high overload.

The controlling and regulating mechanism may be so constructed that the turbine 7 and compressor 6, as well as the engine valves, may also be controlled. Such an arrangement is diagrammatically indicated in Fig. 2 in which engine governor 5a controls through link 8 and slide valves 9 and 31, the turbine 7 and compressor 6, as well as the timing of the engine valves 25 and 26. With a higher pressure difference between the charge supplied a cylinder and the exhaust gases leaving the cylinder an effective scavenging of the cylinder may be insured. In this embodiment, as shown in Fig. 2, the controlling action of the valves by the engine governor may be modified to some extent by the temperature of the exhaust gases which is effective on expansible thermostat 33 suspended between bell crank levers 33' and 33'' and located in the exhaust manifold 4. It is apparent that expansion of thermostat 33 tends to rock bell crank 33' to the right and effects axial displacement of shaft 29 and cams 27 and 28 to the right whereby the valves are held open for longer periods and more complete scavenging and cooling of the exhaust is obtained. In order to be able to scavenge effectively in all cases, the device may be so built that it causes the pressure in conduit 3 to be higher than the pressure in conduit 4 at all loads. As will be seen in Fig. 2, an extension of the thermostat is connected to an arm of bell crank lever 33'' which in turn is connected with link 8 which controls slides 9 and 31. The charging pressure, that is, the pressure in conduit 3, is controlled by the slide 31 operated by rod 8 under the influence of engine governor 5a. The controlling influence of engine governor 5a on these slide valves may be adjusted by turnbuckles 10 and 32. These turnbuckles may be adjusted as follows: At full load the engine should run at a definite speed under the control of the engine governor. By turning alternatively turnbuckles 10 and 32 the positions of slides 9 and 31 are found in such a way that the revolutions of the turbine are as predetermined, for instance, 3000 R. P. M., and the required pressure in pipe 3 is obtained. It is also apparent that adjustment of turnbuckle 10 adjusts the axial position of cam shaft 29 which is under the control of engine governor 5a through connections comprising link 8, belt crank 33'', thermostat 33, and bell crank 33', the controlling action being modified to some extent by thermostat 33.

Assuming constant load on the engine, the position of the governor lever remains unaltered and bell crank lever 33'' is stationary. If for any reasons the exhaust temperatures become higher, the thermostat 33, subject to the temperature of the exhaust gases, expands and, as movement of lever 33'' is resisted by the influence of the engine governor, bell crank lever 33' is rocked in a clockwise direction. By this movement, cam shaft 29 is moved to the right and the engine valves are held open for longer periods whereby complete scavenging is effected and additional cooling air passes through the cylinders into the exhaust. This effects a reduction of the exhaust temperature. If, on the other hand, the temperature of the exhaust gases becomes abnormally low, thermostat 33 contracts and pulls cam shaft 29 to the left, whereby the open periods of the engine valves are shortened and the temperature of the exhaust gases rises.

It is also apparent that the thermostat 33 is effective to some extent to modify the controlling action of governor 5a on the positions of slides 9 and 31 and of the fuel throttle lever 52. Expansion of the thermostat 33 exerts a force on link 8 to the right which by reference to Fig. 6 it will be seen causes the governor sleeve to rise and by reference to Fig. 11, it will be seen that this movement results in feeding more fuel to the engine. As the load on the engine is still the same, the internal combustion engine speeds up. The same load at a higher speed of the engine causes a lower mean effective pressure. Lower mean effective pressures result in lower temperatures. The temperature being lower the thermostat 33 acts now in the opposite direction, so that the temperatures increase again somewhat. This regulation by thermostat 33 resembles the regulation of an engine by an ordinary governor in which, when load is thrown on the engine the R. P. M. decrease, then increase again to stabilize somewhat between the maximum and minimum R. P. M., for which the governor is designed. Similarly these temperatures stabilize between the maximum temperature and the minimum temperature the thermostat is designed for.

A further arrangement of the control and regulation of a power installation according to the invention is illustrated in Fig. 3. Internal combustion engines are provided with a control gear, which enables to start the engine, to run the engine at different loads, or to stop the engines. Gears of this kind are well known to those skilled in the art and do not need to be described here. Provision is made in this case that simultaneously with the setting of the control mechanism 34 of the internal combustion engine to the stop or small load position for the engine the valves 12 and 11 inserted in the conduits 3 and 4 respectively are opened by means of rods 35 and 36 whereby these conduits are brought into open communication with the atmosphere. The said valves are provided for easier starting, so that instead of drawing in air through the blower, the air is drawn in directly from the atmosphere, and instead of exhausting through the turbine the exhaust gases pass through valve 12 and silencer 39 directly to the atmosphere. The resistance of the intake and of the exhaust are thus appropriately reduced, and quicker starting is possible. The position of the control mechanism 34 shown in full lines corresponds to the working of the engine, that shown in dotted lines to the starting with compressed air, and the intermediate position to the stopping of the engine.

The regulation of the compressor aggregate may also be made dependent on the internal combustion engine, as is indicated in Fig. 3 by the links 8. According to the speed of the engine the governor sleeve is in a higher or lower position, thereby influencing also the position of link 8, which is more to the right when the governor sleeve is in its upper position. The spring 43 is therefore more or less stressed to exert different forces on the governor 37 of the compressor aggregate, and accordingly changes the position of slide 9 by means of link 46. If for any reason the speed of turbine 7 increases, the balls of governor 37 (Fig. 5) move outwardly, governor sleeve 47 moves downwardly, spring 43 is tensioned, and slide valve 9 is moved to the right. The force exerted on governor 5 by governor 37 is thereby increased and the sleeve of governor 5 tends to move upwardly and the balls to move inwardly. Movement of the sleeve of governor 5 upwardly decreases the tension in spring 43. At the same time, movement of slide valve 9 to the right increases the inlet area of the turbine, and its speed is consequently reduced. This reduction of speed permits the balls of governor 37 to move inwardly and sleeve 47 upwardly, whereby slide valve 9 is pulled to the left and occupies a position somewhere between its initial position and its extreme position at the right during the operation just described.

It is obvious that when the area of the turbine nozzles is decreased and the volume of gas passing is the same, the speed of the gas is increased and consequently the turbine speed also increases.

This turbine (Fig. 4) has the push rod 46 for moving the slide 9, and one of its chambers is indicated by 7ª. It will be readily understood that by cutting off one or more of chambers 7ª the inlet area becomes smaller, the pressure ahead of the turbine increases and the speed of the turbine also increases.

Figs. 8, 9 and 10 illustrate how governors 13 and 37 may be driven. Numerals 56 and 58 are sprockets linked together by a chain 57 and keyed on shafts 61 and 62 respectively. A pinion gear 59 on shaft 62 is in mesh with pinion 60 keyed on governor shaft 63.

The details of the governing mechanism, Fig. 5, include the governor 5 of the internal combustion engine and the governor 37 of the aggregate linked together so as to mutually control each other.

The governor 5 of the engine regulates the speed of the engine in the orthodox way, whereby the speed rises a few percent from full load to no load as is well known in the art. If the engine is running at half load, for instance, much less fuel is fed to the engine, the temperature of the exhaust gases decreases therefore, hence their volume becomes smaller and the revolutions of the turbine 7 drop considerably. If the turbine 7 drives a generator 24, the tension of the latter falls in the same proportion as the revolutions of the turbine 7. As the blower is also directly connected to the turbine, its capacity is also reduced and the delivery pressure lower.

When the load is thrown off the internal combustion engine, the sleeve of governor 5 moves downward and link 8 and slide 9 are moved to the left. Spring 43 is stretched and being in tension the force exerted on sleeve 47 of governor 37 is increased, the governor balls move inward and push the sleeve 47 upward, so that by means of the bell crank lever the link 46 is pushed to the left to cause slide 9 to close more turbine nozzles, so that the pressure ahead of the nozzles rises. If this pressure rises, the speed of the blower increases and the quantity and pressure of the charge accordingly rises.

On the other hand, if high overloads are dealt with and a big fuel quantity is fed to the engine, the sleeve of governor 5 moves upward, link 8 is pushed to the right, spring 43 is compressed, and being in tension, the force extended thereon decreased, so that the sleeve of governor 37 moves downward, pushing link 46 to the right to cause slide 9 to open more turbine nozzles so that the pressure ahead of the nozzles drop. Due to the increased quantity of fuel, the temperature of the exhaust gases rises and therefore also the pressure ahead of the turbine. This would considerably increase the revolutions of the turbine and therefore also considerably increase capacity and delivery pressure of the blower. By means of the regulating device this is avoided and the pressure ahead of the turbine as well as the delivery pressure reduced as hereinbefore described. In this way too high initial pressures in the engine are avoided and hence also too high maximum pressures and temperatures. Longer life of piston, cylinder head valves is thus insured.

With low loads, only a small amount of fuel is fed to the internal combustion engine. Without applying the present invention, the exhaust temperatures would become low, the exhaust turbine would run slowly, and hence the blower also, so that the delivery pressure of the latter would be low. In internal combustion engines without spark plugs, ignition occurs only when the temperature at the end of the compression is at least as high as the ignition temperature. This temperature at the end of the compression stroke depends on the compression pressure and is the lower, the lower the compression pressure is. As the compression pressure depends on the initial pressure in the cylinder at the beginning of the compression stroke; the compression pressure becomes lower, the lower this initial pressure is. At low loads the pressure at the beginning of the compression stroke can drop to such an extent that the compression pressure becomes so low, that the ignition temperature is not reached any more, and the engine would come to stop. To avoid this, the regulation according to the invention allows for closing nozzles at the turbine inlet thus raising the pressure ahead of the turbine and therefore also raising the turbine speed. The charging pressure is thereby increased and good performance of the engine insured also at very low loads.

The devices 34, 35 and 11; 36 and 12 effect the changing over from starting (dotted line position Fig. 3) to working position, (full line position), so that when lever 34 is moved gradually, at first only little exhaust gases pass through the turbine, not enough to turn it, but sufficient to heat it up. Moving lever 34 more and more to full line position, the turbine starts to rotate slowly and speed up, reaching full speed when lever 34 reaches its final position when 11 and 12 close against the atmosphere or the exhaust silencer 39, respectively.

With the arrangement according to the invention hereinbefore described, the quantity, the pressure or the proportion of mixture respectively of the charge, the fuel admission, the pressure in front of the turbine or the speeds of the constituent parts of the power installation are regulated.

I claim:

1. In a power plant comprising an internal combustion engine, a governor therefor, a fuel pump, means to control said fuel pump by said governor, an exhaust gas turbine, a compressor, driving connection between said turbine and compressor, means to deliver the charge from said compressor to said internal combustion engine, means to convey the exhaust gases of said internal combustion engine to said turbine, adjustable inlet openings to said turbine, means to control said inlet openings, means to modify the action of said controlling means of said inlet openings by the engine governor.

2. In a power plant comprising an internal combustion engine, a governor therefor, a fuel pump, means to control said fuel pump by said governor, an exhaust gas turbine, a compressor, driving connection between said turbine and compressor, means to deliver the charge from said compressor to said internal combustion engine, means to convey the exhaust gases of said internal combustion engine to said turbine, adjustable inlet openings to said turbine, a governor for said exhaust gas turbine, a slide to control said inlet openings to said turbine, means to connect the turbine governor to said slide, connecting means between the engine governor and the turbine governor, a yielding member in said connecting means.

3. In a power plant comprising an internal combustion engine, a governor therefor, a fuel pump, means to control said fuel pump by said governor, an exhaust gas turbine, a compressor, a driving connection between the turbine and compressor, means to deliver the charge from said compressor to said internal combustion engine, means to convey the exhaust gases of said internal combustion engine to said turbine, adjustable inlet openings to said turbine, a governor for said exhaust gas turbine, a slide to control said inlet openings to said turbine, means to connect the turbine governor to said slide, connecting means between the engine governor and the turbine governor, and an adjustable member in said connecting means.

4. In a power plant comprising an internal combustion engine, a governor therefor, a fuel pump, means to control said fuel pump by said governor, an exhaust gas turbine, a compressor, a driving connection between said turbine and compressor, means to deliver the charge from said compressor to said internal combustion engine, means to convey the exhaust gases of said internal combustion engine to said turbine, adjustable inlet openings to said turbine, a governor for said exhaust gas turbine, a slide to control said inlet openings to said turbine, means to connect the turbine governor to said slide, connecting means between the engine governor and the turbine governor, a yielding member and an adjustable member in said connecting means.

In testimony whereof I affix my signature.

ALFRED BUCHI.